United States Patent [19]

Bonner et al.

[11] Patent Number: 4,958,524
[45] Date of Patent: Sep. 25, 1990

[54] FLOW METER

[76] Inventors: Timothy Bonner, 8 Thumwood, Sherfield Park, Chineham, Basingstoke, Hampshire; John R. C. Curthoys, 11 Little Basing, Old Basing, Nr. Basingstoke, Hampshire, both of England

[21] Appl. No.: 348,692

[22] Filed: May 5, 1989

[30] Foreign Application Priority Data

May 10, 1988 [GB] United Kingdom ............... 8810987

[51] Int. Cl.⁵ .......................... G01F 1/32; G01F 1/66
[52] U.S. Cl. ............................ 73/861.18; 73/861.23
[58] Field of Search ........... 73/861.23, 861.18, 861.25, 73/861.26, 861.27, 592, 622, 632, 661

[56] References Cited

U.S. PATENT DOCUMENTS

| 3,903,742 | 9/1975 | Colton | 73/861.23 |
| 4,004,461 | 1/1977 | Lynnworth | 73/861.27 |
| 4,031,757 | 6/1977 | Colton | 73/861.23 |
| 4,297,607 | 10/1981 | Lynnworth et al. | 73/861.18 X |
| 4,417,480 | 11/1983 | Zacharias, Jr. | 73/861.18 |
| 4,607,520 | 8/1986 | Dam | 73/861.28 X |

Primary Examiner—Herbert Goldstein
Attorney, Agent, or Firm—Kilpatrick & Cody

[57] ABSTRACT

A flow meter comprising a metallic conduit (1) through which, in use, fluid flow takes place, and ultrasonic transducer (4) mounted in a wall of the conduit (1) and operable to sense the presence of fluid in the conduit, the transducer being mounted in the conduit wall in metallic mounting (6) which are sealed in said wall by welding (9).

7 Claims, 1 Drawing Sheet

FLOW METER

BACKGROUND OF THE INVENTION

1. Field of the Invention

This invention relates to flow meters and more particularly to ultrasonic flow meters, which term is intended to cover fluid presence sensors, i.e. sensors which indicate the presence of a fluid as opposed to a continuous flow of a fluid.

2. Description of the Prior Art

Ultrasonic flow meters are well known and comprise ultrasonic transducer means mounted in relation to a conduit, through which a fluid flows, or in which a fluid is present from time to time, such that an ultrasonic signal can be transmitted across the conduit. Usually, a pair of ultrasonic transducers is employed, the two transducers being mounted on opposed sides of the conduit with one acting as an ultrasonic transmitter and the other as an ultrasonic receiver. Assuming a cylindrical conduit, the two transducers are mounted diametrically opposite and extreme care has been taken in the past to ensure that the ultrasonic signal emitted by the transmitter is directed across the conduit, and hence through any fluid therein, as opposed to around the wall of the conduit, the latter being the path of least resistance and thus the "preferred" path of the ultrasonic signals. To this end, each transducer has been mounted in a cup inserted into the wall of the conduit, the cup being sealded into that wall with a silicon-based sealant, for example. If the cups are metallic, then it is usual to provide a non-metallic mount therefor, again to safeguard against the risk of an acoustic short circuit around the wall of the conduit.

These precautions against acoustic short circuiting are tedious but more importantly, it is impossible to achieve a leak-proof seal between the cup and conduit for certain fluids and/or pressures. One of the most difficult fluids in this respect is steam. Thus whilst the short circuiting problem is solved by the use of an acoustic insulator between each transducer and the conduit by way of the non-metallic mount and/or sealant, the seal achieved is not viable under certain conditions.

SUMMARY OF THE INVENTION

In addressing this problem, it was discovered that, contrary to all expectations, the use of a metallic seal between a metallic mount and a metallic conduit does not give rise to an acoustic short circuit around the wall of the conduit. Thus, according to the present invention there is provided a flow meter comprising a metallic conduit through which, in use, fluid flow takes place, and ultrasonic transducer means mounted in a wall of the conduit and operable to sense the presence of fluid in the conduit, the transducer means being mounted in the conduit wall in metallic mounting means which are spaced from said wall but sealed thereto by welding.

The term "welding" as used herein is intended to cover any process for joining together two metallic components, such as brazing or soldering, for example.

The transducer means may comprise a pair of transducers, preferably of the piezo-electric type, mounted on opposed sides of the conduit which may be cylindrical, with one transducer arranged as a transmitter and the other as a receiver. The or each transducer may be mounted in an aperture through the wall of the conduit dimensioned to receive the associated mounting means which may be in the form of a cup having its closed end facing into the conduit.

BRIEF DESCRIPTION OF THE DRAWINGS

A flow meter according to the present invention will now be described in greater detail, by way of example, with reference to the accompanying drawings, in which.

DESCRIPTION OF THE PREFERRED EMBODIMENT

Figure 1:
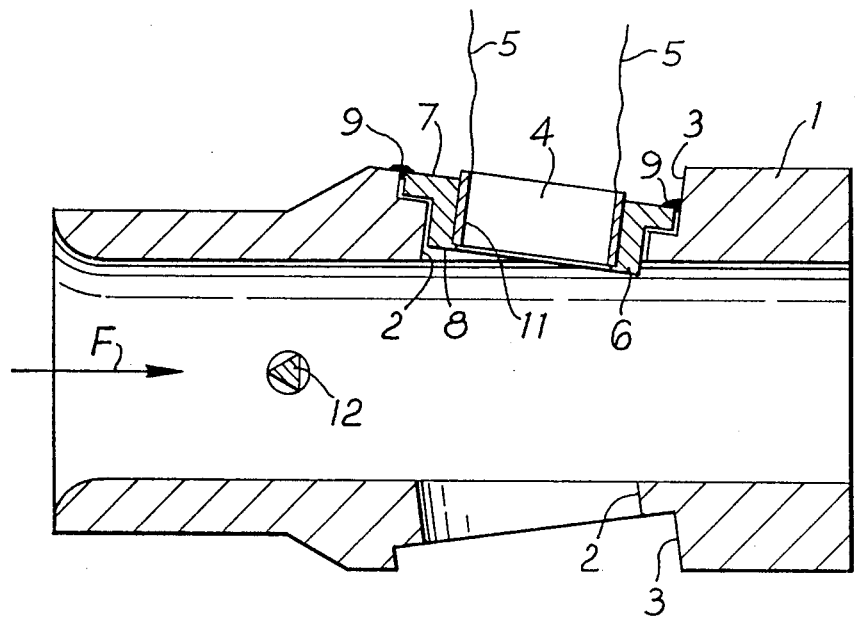
FIG. 1 is a longitudinal cross section of the flow meter.
Figure 2:
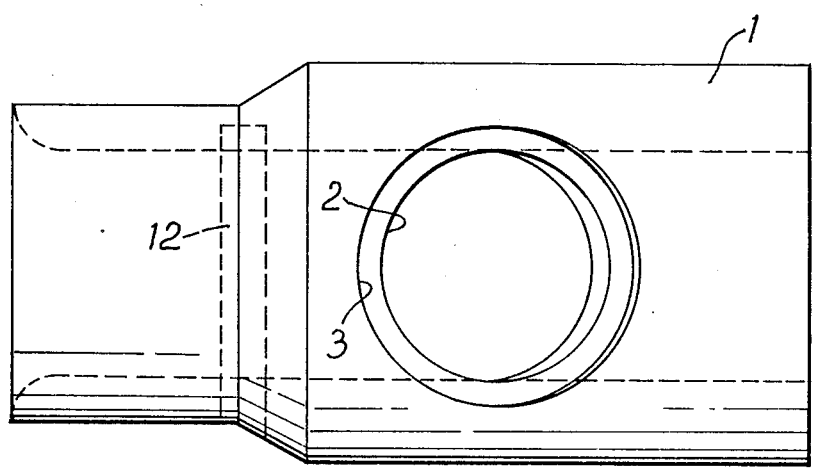
FIG. 2 is a plan view of the underside of FIG. 1.

The flow meter is of the Karman vortex shedding type and comprises a cylindrical conduit 1 which may be of stainless steel, for example, and which forms the body of the flow meter. Two diametrically opposed apertures 2 are drilled in the wall of the conduit 1, the axes of these apertures being inclined to the longitudinal axis of the conduit 1 by an angle of the order of 7° for a purpose to be described. However, this angle may be varied, or the axis of each aperture 2 may be at right angles to the longitudinal axis of the conduit 1. Each aperture 2 is counterbored 3. Transducer means in the form of a pair of ultrasonic transducers 4 are mounted in the apertures 2, only one transducer being shown in FIG. 1 of the drawings. The transducer 4 may be of any type but is preferably of the piezo-electric type, with one transducer acting as a transmitter and the other as a receiver. A pair of electrical leads 5 is provided for each transducer 4 which is mounted in a metallic, for example stainless steel, cup 6 having a body portion dimensioned to be received within but spaced from the associated aperture 2, and a flanged rim 7 dimensioned to be received within but again spaced for the associated counterbore 3. The closed end 8 of each cup 6 faces inwardly of the conduit and is secured in position by a weld 9 around the periphery of the flange 7. In order to accommodate tolerances, each transducer 4 is mounted within a sleeve 11 which is preferably of a synthetic material such as PTFE, for example. Also, in order to assist in the transmission of ultrasonic signals between each transducer 4 and the closed end of the associated cup 6, a slip of PTFE, for example, may be provided in the base of the cup 6 having a silicon grease, for example, applied to both sides thereof.

In as much as Karman vortex shedding type of flow sensor involves the provision of a strut across the conduit, such is provided at 12, the strut being of triangular cross section with the apex of the triangle facing the direction of the flow to be measured (indicated by arrow F in FIG. 1), and with the transducers 4 being positioned in the vortex street produced by the strut 12. The bores 2 in the wall of the conduit 1 are inclined so that the faces of the cups 6, and hence the operative faces of the transducers 4, taper inwardly so that these faces are directed towards the strut 12. The strut 12 extends diametrically across the conduit 1 and is mounted by drilling through one side of the conduit wall and into, but not through, the opposed wall so that the strut sits in a blind bore on one side and in a through bore in the other side of the conduit wall, the through bore being sealed by welding. A through bore may be provided and the strut welded in position at each end.

As already discussed, the provision of a metallic conduit 1 and metallic mounting cups 6 for the transducers 4 would normally lead the skilled person to expect problems in use of the flow meter in as much as the ultrasonic signals would be expected to take the path of least resistance around the wall of the conduit 1 rather than across the bore thereof, the latter path being necessary in order for the flow meter to function. However, the welding of the mounting cups 6 within the apertures 2 in the conduit has been found, for some reason which cannot be fully explained, to prevent this acoustic short circuiting and avoid the need to select appropriate synthetic plastic mounting means and/or sealants and, more importantly, provides a seal which remains viable under what would normally be adverse conditions, such as relatively high pressure. More specifically, the seal remains viable when handling steam which has proved to be an extremely difficult medium to handle with known flow meters. The reason why the weld appears to provide an acoustic insulator, as opposed to the expected acoustic conductor, is believed to be the weld presents an effective discontinuity in the path between the mounting cups 6 and the body of the conduit 1.

In operation, one of the transducers 4 is driven to act as a transmitter of ultrasonic pulses which are transmitted across the bore of the conduit 1. The other transducer 4 acts as a receiver and the delay in receipt of a transducer pulse provides an indication of the flow of fluid in the conduit as is well know.

It will be seen that the present invention affords an extremely simple, but totally unexpected, solution to the problem of being able to handle all fluids at all pressures, which solution could not have been forecast and indeed has been studiously avoided to date. It is emphasised that the present invention is applicable to fluid sensors as well as flow meters, as already explained and it is also applicable to flow meters or fluid sensors which are other than of the Karman vortex shedding type.

We claim:

1. A flow meter as defined herein comprising a metallic conduit through which, in use, fluid flow takes place, and ultrasonic transducer means mounted in a wall of the conduit and operable to sense the presence of fluid in the conduit, the transducer means being mounted in the conduit wall in metallic mounting means which are spaced from said wall but sealed thereto by welding.

2. A flow meter according to claim 1, wherein the transducer means comprise a pair of transducers mounted on opposed sides of the conduit, with one transducer arranged as a transmitter and the other as a receiver.

3. A flow meter according to claim 2, wherein each transducer is mounted in an aperture through the wall of the conduit dimensioned to receive the associated mounting means in the form of a cup having its closed end facing into the conduit.

4. A flow meter according to claim 3, wherein the axis of the or each aperture is inclined to the longitudinal axis of the conduit.

5. A flow meter according to claim 4, wherein said angle of inclination is 7°.

6. A flow meter according to claim 3, wherein means are provided within the or each cup to assist in the transmission/reception of ultrasonic signals.

7. A flow meter according to claim 6, wherein said means is in the form of a piece of synthetic plastics material having a silicon grease applied to opposed sides thereof.

* * * * *

UNITED STATES PATENT AND TRADEMARK OFFICE
CERTIFICATE OF CORRECTION

PATENT NO. : 4,958,524

DATED : September 25, 1990

INVENTOR(S) : Timothy Bonner and John R. C. Curthoys

It is certified that error appears in the above-identified patent and that said Letters Patent is hereby corrected as shown below:

On the title page, insert the following:
--[73] Assignee: Scheme Engineering Ltd., Berkshire, England--.

Signed and Sealed this

Sixteenth Day of June, 1992

Attest:

DOUGLAS B. COMER

*Attesting Officer*  *Acting Commissioner of Patents and Trademarks*